(12) United States Patent
Ma et al.

(10) Patent No.: US 12,546,601 B2
(45) Date of Patent: Feb. 10, 2026

(54) MICRO-MECHANICAL GYROSCOPE AND ELECTRONIC PRODUCT

(71) Applicant: AAC Kaitai Technologies (Wuhan) CO., LTD., Hubei (CN)

(72) Inventors: Zhao Ma, Wuhan (CN); Shitao Yan, Wuhan (CN); Shan Yang, Wuhan (CN); Zhan Zhan, Wuhan (CN); Xiao Kan, Wuhan (CN); Yang Li, Wuhan (CN); Veronica Tan, Singapore (SG); Kahkeen Lai, Singapore (SG)

(73) Assignee: AAC Kaitai Technologies (Wuhan) CO., LTD., Wuhan (CN)

( * ) Notice: Subject to any disclaimer, the term of this patent is extended or adjusted under 35 U.S.C. 154(b) by 319 days.

(21) Appl. No.: 18/324,186

(22) Filed: May 26, 2023

(65) Prior Publication Data

US 2024/0271933 A1 Aug. 15, 2024

Related U.S. Application Data

(63) Continuation of application No. PCT/CN2023/086853, filed on Apr. 7, 2023.

(30) Foreign Application Priority Data

Feb. 14, 2023 (CN) .......................... 202310127020.4

(51) Int. Cl.
*G01C 19/00* (2013.01)
*G01C 19/5733* (2012.01)

(52) U.S. Cl.
CPC ....... *G01C 19/005* (2022.01); *G01C 19/5733* (2013.01)

(58) Field of Classification Search
None
See application file for complete search history.

(56) References Cited

U.S. PATENT DOCUMENTS

| | | | |
|---|---|---|---|
| 8,616,057 B1 * | 12/2013 | Mao ...................... | G01C 19/574 |
| | | | 73/504.12 |
| 11,193,771 B1 * | 12/2021 | Gregory .............. | G01C 19/5712 |
| 11,313,681 B2 * | 4/2022 | Gattere .............. | G01C 19/5747 |
| 2011/0154898 A1 * | 6/2011 | Cazzaniga .......... | G01C 19/5747 |
| | | | 73/504.12 |
| 2016/0370180 A1 * | 12/2016 | Naumann .......... | G01C 19/5621 |
| 2020/0309806 A1 * | 10/2020 | Pruetz ....................... | G01P 3/44 |
| 2022/0065630 A1 * | 3/2022 | Joet ..................... | G01C 19/5663 |
| 2023/0266122 A1 * | 8/2023 | Ma ..................... | G01C 19/5733 |

* cited by examiner

*Primary Examiner* — Mark A Shabman
(74) *Attorney, Agent, or Firm* — Wiersch Law Group (57) ABSTRACT

The present disclosure provides a micro-mechanical gyroscope and an electronic product. The micro-mechanical gyroscope includes a plurality of first mass blocks, a plurality of second mass blocks, a plurality of driving members, first connecting beams and second connecting beams. The first mass blocks are arranged to face to each other in a first direction, and the second mass blocks are arranged between the first mass blocks and arranged to face to each other in a second direction perpendicular to the first direction. In the second direction, the driving members are arranged on either sides of the first mass blocks and of the second mass blocks. Ends of the first mass blocks in the second direction are connected to driving members, respectively, through the first connecting beams, and the second mass blocks are connected to adjacent driving members, respectively, through the second connecting beams 5.

8 Claims, 8 Drawing Sheets

MICRO-MECHANICAL GYROSCOPE AND ELECTRONIC PRODUCT

CROSS REFERENCE TO RELATED APPLICATIONS

The present application is a continuation of PCT Patent Application No. PCT/CN2023/086853, filed Apr. 7, 2023, which claims priority to Chinese patent application No. 202310127020.4, filed Feb. 14, 2023, each of which is incorporated by reference herein in its entirety.

TECHNICAL FIELD

The present disclosure relates to the field of gyroscope technology, and in particular to a micro-mechanical gyroscope and an electronic product.

BACKGROUND

Micro-mechanical gyroscope is a micro angular velocity sensor made using micro-mechanical processing technology and microelectronics technology. In the driving mode, the micro-mechanical gyroscope oscillates around the axis of a vertical mass block. When being applied an angular velocity, due to the Coriolis effect, the gyroscope transfers energy to the detection mode, causing the vibrating disk to swing out of the plane under relative drive. The angular velocity can be acquired by detecting the displacement of the out-of-plane oscillation.

In the Micro-mechanical gyroscopes according to the related technologies, the detection mode and the driving mode share a mass block, resulting in superposition of detection errors due to the coupling of the two modes.

Therefore, it is necessary to provide a new micro-mechanical gyroscope to address the above problem.

SUMMARY

The present disclosure aims to provide a micro-mechanical gyroscope and an electronic product, which can reduce the degree of mutual interference of the mass blocks in different modes. In this way, detection accuracy can be improved.

The technical solution of the present disclosure is as follows.

Some embodiments of the present disclosure provide a micro-mechanical gyroscope, including:
a plurality of first mass blocks and a plurality of second mass blocks, the plurality of first mass blocks are arranged to face to each other in a first direction, and the plurality of second mass blocks are arranged between the plurality of first mass blocks and arranged to face to each other in a second direction perpendicular to the first direction;
a plurality of driving members, in the second direction, the plurality of driving members are arranged on either sides of the plurality of first mass blocks and of the plurality of second mass blocks; and
first connecting beams and second connecting beams being flexible beams.

Ends of the plurality of first mass blocks in the second direction are connected to driving members arranged on either sides of the plurality of first mass blocks, respectively, through the first connecting beams, and the plurality of second mass blocks are connected to adjacent driving members, respectively, through the second connecting beams.

In some embodiments, the plurality of first mass blocks are symmetrically arranged along the first direction, the plurality of second mass blocks are symmetrically arranged along the second direction, and the driving members are symmetrically arranged along the second direction.

In some embodiments, the micro-mechanical gyroscope further includes a connecting frame. The plurality of second mass blocks are arranged in the connecting frame, and the plurality of first mass blocks and the plurality of driving members are arranged out of the connecting frame.

Each end of a first mass block in the second direction is connected to a side of the connecting frame facing to the first mass blocks through a first connecting beam, the plurality of second mass blocks are connected to sides of the connecting frame along the second direction through the second connecting beams, and the plurality of driving members are connected to side walls of the connecting frame along the second direction.

In some embodiments, the micro-mechanical gyroscope further includes third connecting beams. Each third connecting beam of the third connecting beams has a bent segment, and the plurality of driving members are connected to the side walls of the connecting frame along the second direction through the third connecting beams.

In some embodiments, the micro-mechanical gyroscope further includes a base having a rectangular area, first anchor points and second anchor points. The plurality of first mass blocks, the plurality of second mass blocks and the plurality of driving members are arranged in the rectangular area. A respective first anchor point is arranged at each corner of the rectangular area, and in the second direction, the second anchor points are arranged between the plurality of second mass blocks.

The micro-mechanical gyroscope further includes first coupling beams, second coupling beams and third coupling beams, the first coupling beams and the second coupling beams are flexible beams. Each end of a first mass block in the second direction is connected to a respective first anchor point through a respective first coupling beam, each second mass block of the plurality of second mass blocks is connected to a respective second anchor point through a respective second coupling beam and each end of a driving member in the first direction is connected to a respective first anchor point through a respective third coupling beam.

In some embodiments, the micro-mechanical gyroscope further includes fourth coupling beams being flexible beams. In the second direction, two second coupling beams are connected to each other through a respective fourth coupling beam.

In some embodiments, the micro-mechanical gyroscope further includes coupling parts being flexible parts. In the second direction, the plurality of second mass blocks are connected to each other through the coupling parts.

In some embodiments, the micro-mechanical gyroscope further includes in-plane driving transducers, out-of-plane detection transducers, and in-plane detection transducers. A respective accommodation space is defined in each driving member of the plurality of driving members on a side away from the plurality of second mass blocks, and each in-plane driving transducer of the in-plane driving transducers is arranged in a respective accommodation space. An out-of-plane detection transducer and in-plane detection transducers spaced from each other are arranged on a second mass block, and a respective out-of-plane detection transducer is arranged on each first mass block of the plurality of first mass blocks.

In some embodiments, out-of-plane detection transducers arranged on the plurality of first mass blocks are symmetrically arranged along the first direction. The out-of-plane detection transducers arranged on the plurality of second mass blocks are symmetrically arranged along the second direction. A plurality of in-plane detection transducers are uniformly arranged along the circumference of the micro-mechanical gyroscope.

Some embodiments of the present disclosure provide an electronic product, including:
  a main body; and
  the micro-mechanical gyroscope as illustrated above, and the micro-mechanical gyroscope is installed in the main body.

The present disclosure has the following beneficial effects.

In the micro-mechanical gyroscope and the electronic product provided by the present disclosure, the plurality of first mass blocks are arranged to face to each other in a first direction, and the plurality of second mass blocks are arranged between the plurality of first mass blocks and arranged to face to each other in a second direction. In the second direction, the plurality of driving members are arranged on either sides of the plurality of first mass blocks and of the plurality of second mass blocks. The plurality of first mass blocks and the plurality of second mass blocks are connected to the plurality of driving members, respectively, through flexible beams. When detecting angular velocity by the micro-mechanical gyroscope, the coupling between the driving mode and the detection modes of the plurality of first mass blocks and the plurality of second mass blocks can be reduced, thereby reducing the displacement of non-moving mass blocks. In this way, the degree of mutual interference of the plurality of first mass blocks and the plurality of second mass blocks in different modes can be reduced, and detection accuracy can be improved.

REFERENCE NUMERALS

1—first mass blocks;
2—second mass blocks;
3—driving member; 30—accommodation space; 31—first portion; 32—second portion;
4—first connecting beam;
5—second connecting beam;
6—connecting frame;
7—third connecting beam;
8—base; 81—square-rectangular_area; 82—first anchor points; 83—second anchor points;
9—first coupling beam;
10—second coupling beam;
11—third first coupling beam;
12—fourth coupling beam;
13—coupling part; 131—body part; 132—fifth coupling beam;
14—in-plane driving transducers;
15—out-of-plane detection transducers;
16—in-plane detection transducers.

DETAILED DESCRIPTION OF EMBODIMENTS

The present disclosure will be further illustrated in conjunction with the accompanying drawings and embodiments.

The present disclosure provides a micro-mechanical gyroscope, as shown in FIGS. 1 to 4, the micro-mechanical gyroscope includes a plurality of first mass blocks 1, a plurality of second mass blocks 2, a plurality of driving members 3, first connecting beams 4 and second connecting beams 5. The plurality of first mass blocks 1 are arranged to face to each other in a first direction Y, and the plurality of second mass blocks 2 are arranged between the plurality of first mass blocks 1 and arranged to face to each other in a second direction X perpendicular to the first direction Y. In the second direction X, the plurality of driving members 3 are arranged on either sides of the plurality of first mass blocks 1 and of the plurality of second mass blocks 2. The first connecting beams 4 and the second connecting beams 5 are flexible beams. Ends of the plurality of first mass blocks 1 in the second direction X are connected to driving members 3 arranged on either sides of the plurality of first mass blocks 1, respectively, through the first connecting beams 4, and the plurality of second mass blocks 2 are connected to adjacent driving members 3, respectively, through the second connecting beams 5.

Figure 1:
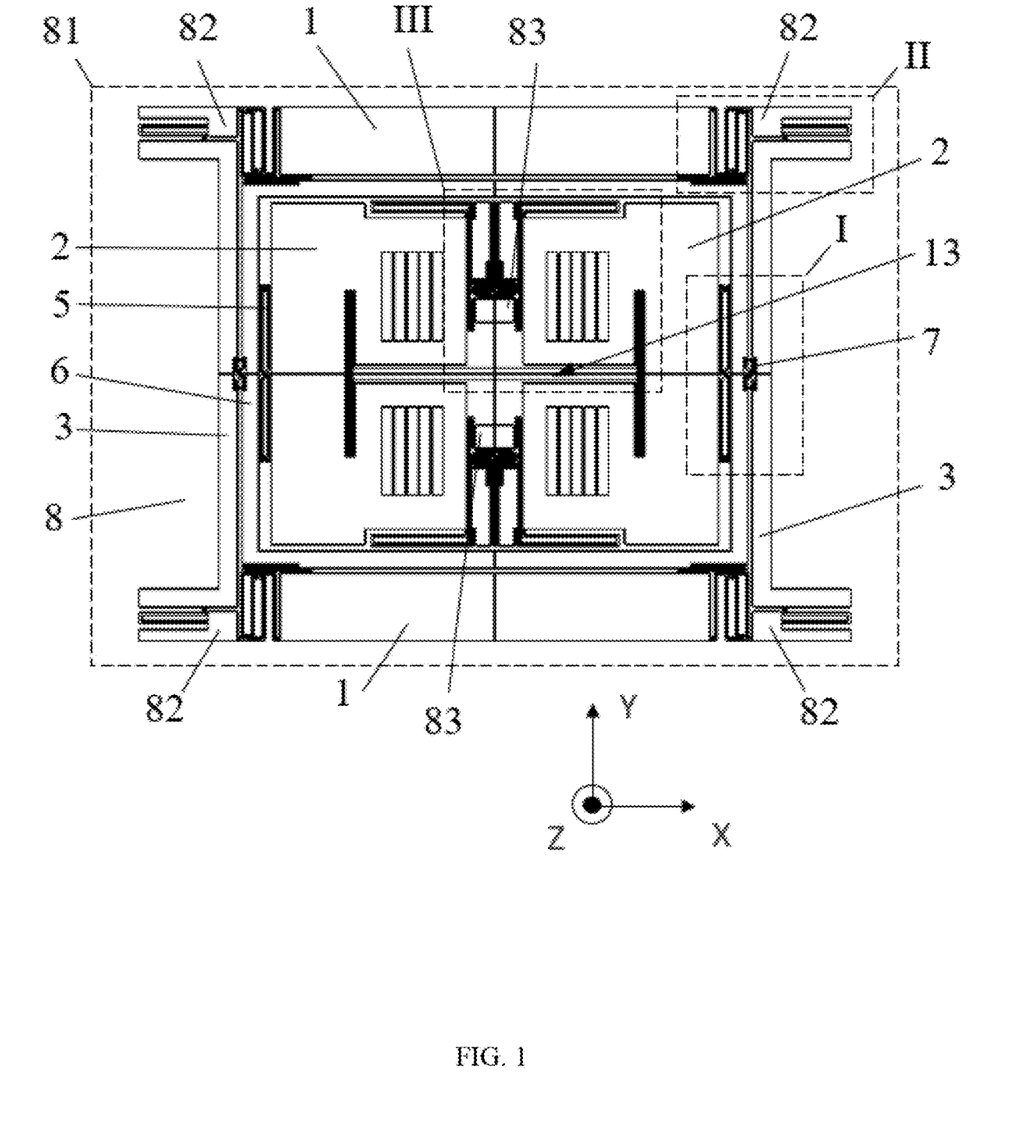
FIG. 1 is a front view of the micro-mechanical gyroscope according to some embodiments of the present disclosure.

The micro-mechanical gyroscope has four working modes, i.e. a driving mode, a first detection mode, a second detection mode and a third detection mode. As shown in FIG. 1, there are two first mass blocks 1, two second mass blocks 2 and two driving members 3. In the first direction Y, the two second mass blocks 2 are arranged between the two first mass blocks 1. In the second direction X, the two second mass blocks 2 are arranged to face to each other. The two first mass blocks 1 and the two second mass blocks 2 are arranged between the two driving members 3. The first direction Y is defined as the direction of the Y axis, the second direction X is defined as the direction of the X axis, the Z axis is perpendicular to both the X and Y axes, and the plane where the X and Y axes are located is defined as the reference plane.

Exemplarily, when detecting angular velocity, the micro-mechanical gyroscope is put in the driving mode first. In the driving mode, the two driving members 3 moves in the directions as shown by the black arrows in FIG. 7, respectively, and drives the two first mass blocks 1 and the two second mass blocks 2 to move in the directions as shown by the white arrows in FIG. 7, respectively.

When being applied a Y-axis angular velocity, the micro-mechanical gyroscope is put from the driving mode to the first detection mode. In this case, the first mass blocks 1 are subjected to Coriolis forces in the Z-axis direction (as shown by the white arrows in FIG. 8). Therefore, the first mass blocks 1 generate an out-of-plane vibration displacement along the Z-axis (i.e., vibration displacement towards the outside of the reference plane). By detecting the out-of-plane vibration displacement of the first mass blocks 1 along the Z-axis, the angular velocity around the Y-axis can be acquired by the micro-mechanical gyroscope.

When being applied an X-axis angular velocity, the micro-mechanical gyroscope is put from the driving mode to the second detection mode. In this case, the second mass blocks 2 are subjected to Coriolis forces in the Z-axis direction (as shown by the white arrows in FIG. 9). Therefore, the second mass blocks 2 generate an out-of-plane vibration displacement along the Z-axis (i.e., vibration displacement towards the outside of the reference plane). By detecting the out-of-plane vibration displacement of the second mass blocks 2 along the Z-axis, the angular velocity around the X-axis can be acquired by the micro-mechanical gyroscope.

Figure 10:
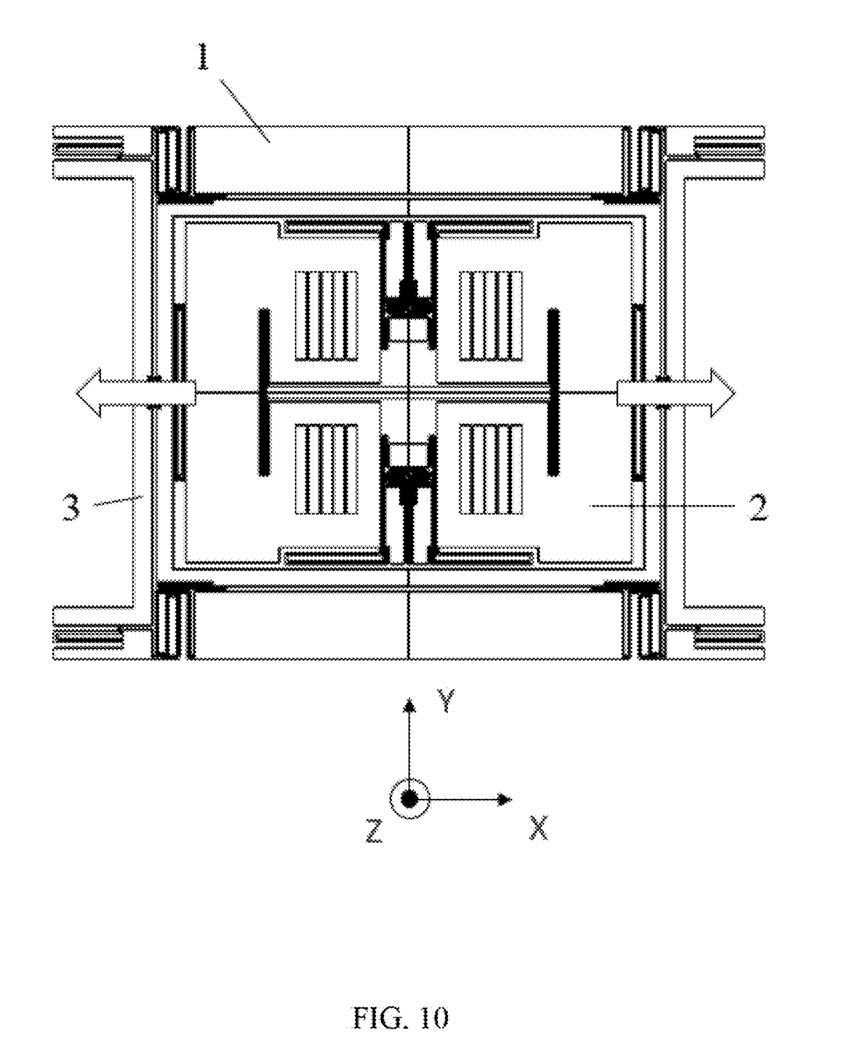
FIG. 10 is a structure diagram of the micro-mechanical gyroscope in the third detection mode according to some embodiments of the present disclosure.

When being applied a Z-axis angular velocity, the micro-mechanical gyroscope is put from the driving mode to the third detection mode. In this case, the second mass blocks 2 are subjected to Coriolis forces in the X-axis direction (as shown by the white arrows in FIG. 10). Therefore, the second mass blocks 2 generate an in-plane vibration displacement along the X-axis (i.e., vibration displacement in the reference plane). By detecting the in-plane vibration displacement of the second mass blocks 2 along the X-axis, the angular velocity around the Z-axis can be acquired by the micro-mechanical gyroscope.

In the micro-mechanical gyroscope provided by the present disclosure, the plurality of first mass blocks 1 are arranged to face to each other in a first direction Y, and the plurality of second mass blocks 2 are arranged between the plurality of first mass blocks 1 and arranged to face to each other in a second direction X. In the second direction X, the plurality of driving members 3 are arranged on either sides of the plurality of first mass blocks 1 and of the plurality of second mass blocks 2. The plurality of first mass blocks 1 and the plurality of second mass blocks 2 are connected to the plurality of driving members 3, respectively, through flexible beams. When detecting angular velocity by the micro-mechanical gyroscope, the coupling between the driving mode and the detection modes of the plurality of first mass blocks 1 and the plurality of second mass blocks 2 can be reduced, thereby reducing the displacement of non-moving mass blocks. In this way, the degree of mutual interference of the plurality of first mass blocks 1 and the plurality of second mass blocks 2 in different modes can be reduced, and detection accuracy can be improved.

Moreover, the high proportion of shared mass between driving and detection effectively improves the conversion of Coriolis forces and enhances the sensitivity of the micro-mechanical gyroscope. This type of micro-mechanical gyroscope has a simple structure and is convenient for small-scale integration under limited process conditions, therefore has a reduced cost.

The driving mode of this type of micro-mechanical gyroscope uses differential driving, which can effectively improve the stability and impact resistance of driving of the micro-mechanical gyroscope.

Moreover, the three detection modes of the micro-mechanical gyroscope can achieve inverted vibration, which can effectively prevent the impact of acceleration shock and orthogonal errors.

In some embodiments, the plurality of first mass blocks 1 are symmetrically arranged along the first direction Y, the plurality of second mass blocks 2 are symmetrically arranged along the second direction X, and the plurality of driving members 3 are symmetrically arranged along the second direction X. In this way, differential detection of the micro-mechanical gyroscope can be implemented.

Figure 5:
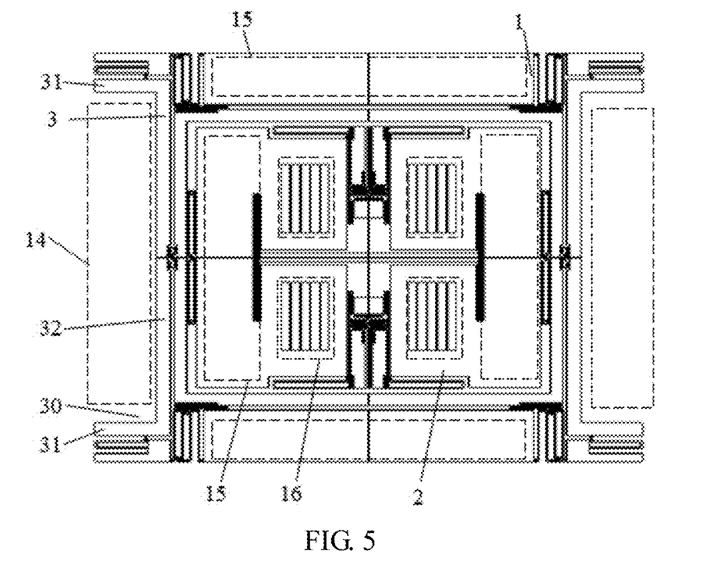
FIG. 5 is a schematic diagram of the micro-mechanical gyroscope incorporating in-plane driving transducers, out-of-plane detection transducers and in-plane detection transducers according to some embodiments of the present disclosure.
Figure 6:
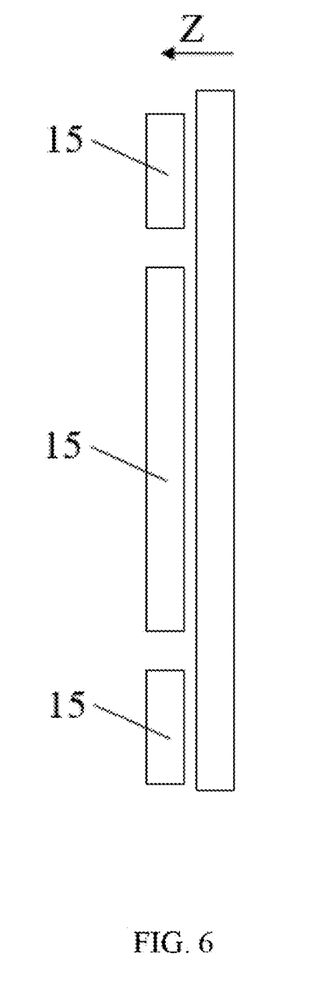
FIG. 6 is a side view of FIG. 5.

In some embodiments, as shown in FIGS. 5 and 6, the micro-mechanical gyroscope further includes in-plane driving transducers 14 (also referred to as in-plane driving electrodes), out-of-plane detection transducers 15 (also referred to as out-of-plane detection electrodes), and in-plane detection transducers 16 (also referred to as in-plane detection electrodes). Each driving member 3 includes two first portions 31 spaced apart from each other in the first direction Y and perpendicular to the first direction Y and a second portion 32 connecting the two first portions 31 and perpendicular to the second direction X, and an accommodation space 30 is formed by the two first portions 31 and the second portion 32. A respective accommodation space 30 is defined in each driving member of the plurality of driving members 3 on a side away from the plurality of second mass blocks 2, and each in-plane driving transducer 14 is arranged in a respective accommodation space 30. An out-of-plane detection transducer 15 and in-plane detection transducers 16 spaced from each other are arranged on a second mass block 2, and a respective out-of-plane detection transducer 15 is arranged on each first mass block of the plurality of first mass blocks 1.

When the micro-mechanical gyroscope is in the first detection mode, the first mass blocks 1 generate vibration displacement along the Z-axis due to the Coriolis forces. In this case, the out-of-plane detection transducers 15 arranged on the first mass blocks 1 detect the vibration displacement generated by the first mass blocks 1 along the Z-axis, thereby acquiring the angular velocity of the micro-mechanical gyroscope around the Y-axis.

When the micro-mechanical gyroscope is in the second detection mode, the second mass blocks 2 generate vibration displacement along the Z-axis due to the Coriolis forces. In this case, the out-of-plane detection transducers 15 arranged on the second mass blocks 2 detect the vibration displacement generated by the second mass blocks 2 along the Z-axis, thereby acquiring the angular velocity of the micro-mechanical gyroscope around the X-axis.

When the micro-mechanical gyroscope is in the third detection mode, the second mass blocks 2 generate vibration displacement along the X-axis due to the Coriolis forces. In this case, the in-plane detection transducers 16 arranged on the second mass blocks 2 detect the vibration displacement generated by the second mass blocks 2 along the X-axis, thereby acquiring the angular velocity of the micro-mechanical gyroscope around the Z-axis.

In some embodiments, the out-of-plane detection transducers 15 arranged on the plurality of first mass blocks 1 are symmetrically arranged along the first direction Y, the out-of-plane detection transducers 15 arranged on the plurality of second mass blocks 2 are symmetrically arranged along the second direction X, and the plurality of in-plane detection transducers 16 are uniformly arranged along the circumference of the micro-mechanical gyroscope.

As shown in FIG. 5, an out-of-plane detection transducer 15 is arranged on each first mass block 1, and along the first direction Y, the two out-of-plane detection transducers 15 on the two first mass blocks 1 are symmetrically arranged. An out-of-plane detection transducer 15 is arranged on each second mass block 2, and along the second direction X, the two out-of-plane detection transducers 15 on the two second mass blocks 2 are symmetrically arranged. There are four in-plane detection transducers 16, and the four in-plane detection transducers 16 are uniformly arranged along the circumference of the micro-mechanical gyroscope.

In this way, differential detection of the micro-mechanical gyroscope can be implemented.

Figure 2:
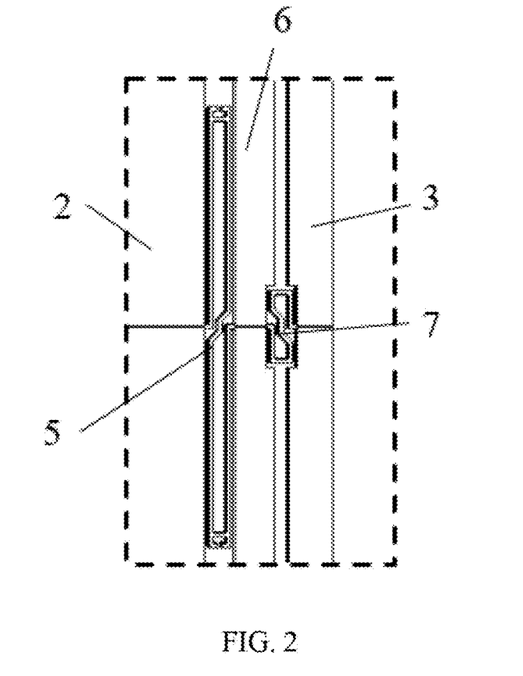
FIG. 2 is an enlarged view of location I in FIG. 1.
Figure 3:
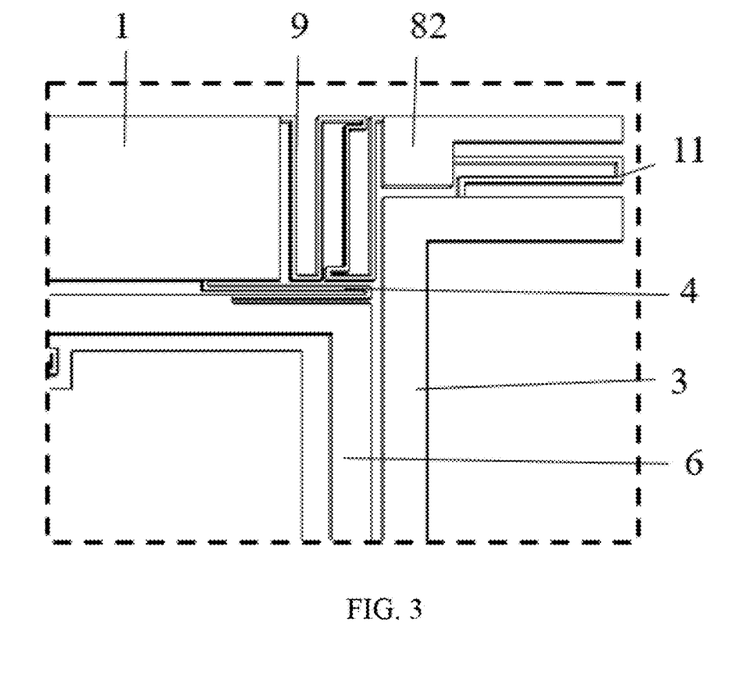
FIG. 3 is an enlarged view of location II in FIG. 1.
Figure 4:
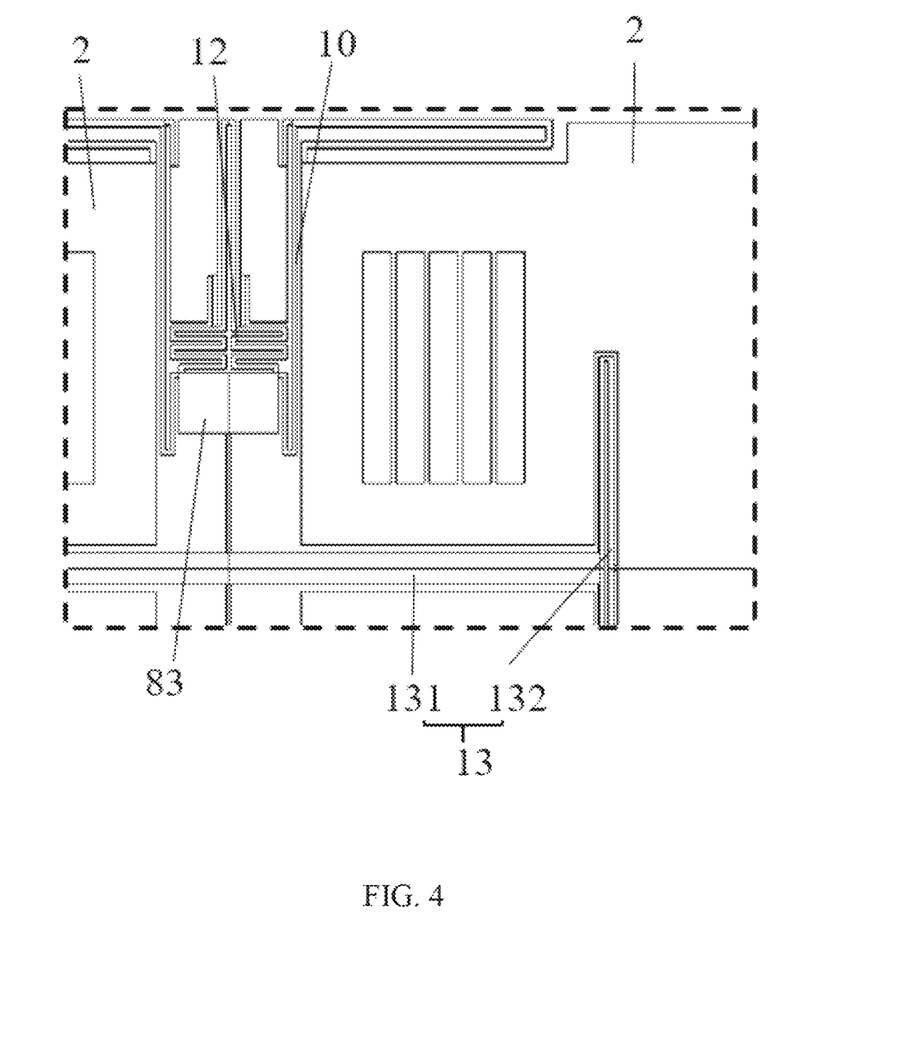
FIG. 4 is an enlarged view of location III in FIG. 1.

In some embodiments, as shown in FIGS. 1 to 3, the micro-mechanical gyroscope further includes a connecting frame 6. The plurality of second mass blocks 2 are arranged in the connecting frame 6, and the plurality of first mass blocks 1 and the plurality of driving members 3 are arranged out of the connecting frame 6. Each end of a first mass block 1 in the second direction X is connected to a side of the connecting frame 6 facing to the first mass blocks 1 through a first connecting beam 4, the plurality of second mass blocks 2 are connected to sides of the connecting frame 6 along the second direction X through the second connecting beams 5, and the plurality of driving members 3 are connected to side walls of the connecting frame 6 along the second direction X.

Figure 7:
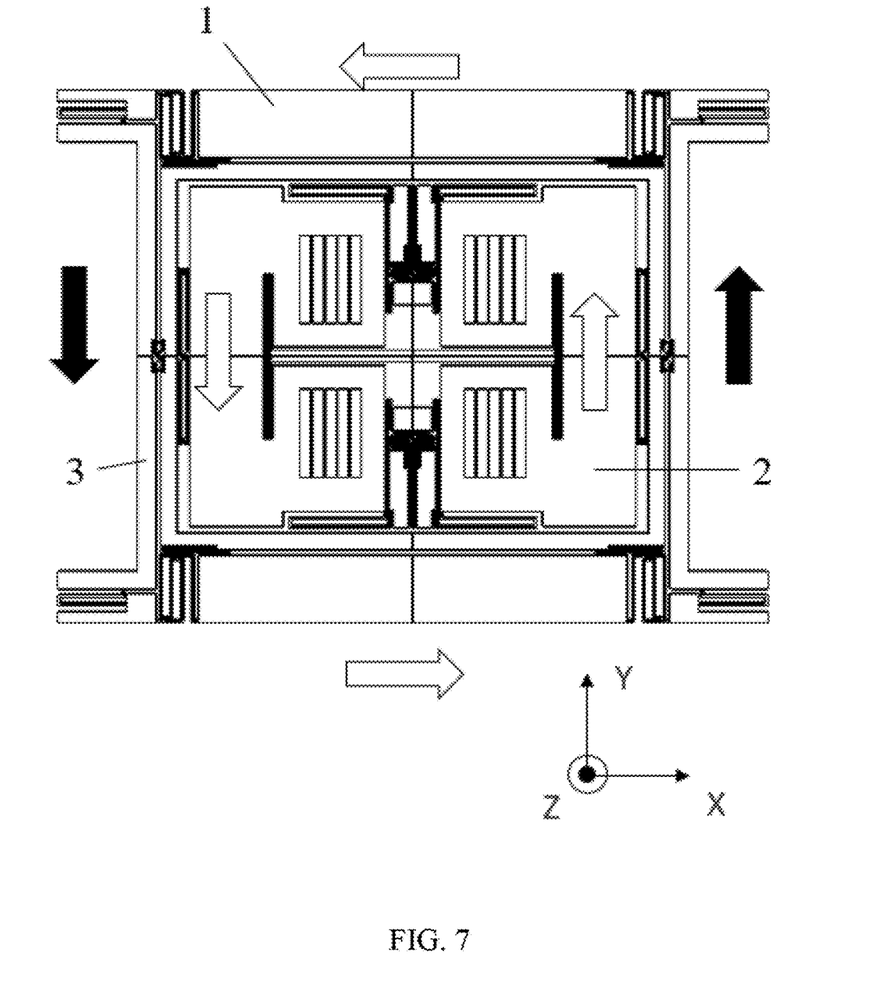
FIG. 7 is a structure diagram of the micro-mechanical gyroscope in the driving mode according to some embodiments of the present disclosure.

As shown in FIG. 7, when the micro-mechanical gyroscope is in the driving mode, two driving members 3 move in the directions as shown by the black arrows in FIG. 7, and drive the connecting frame 6 to move. The connecting frame 6 then drives the plurality of first mass blocks 1 and the plurality of second mass blocks 2 to move in the directions as shown by the white arrows in FIG. 7.

In some embodiments, the micro-mechanical gyroscope further includes third connecting beams 7. Each third connecting beam of the third connecting beams 7 has a bent segment, and the plurality of driving members 3 are connected to the side walls of the connecting frame 6 along the second direction X through the third connecting beams 7. The third connecting beams 7 are used to provide in-plane oscillation degrees of freedom.

In some embodiments, as shown in FIGS. 1 to 4, the micro-mechanical gyroscope further includes a base 8 having a rectangular area 81, first anchor points 82 and second anchor points 83. The plurality of first mass blocks 1, the plurality of second mass blocks 2 and the plurality of driving members 3 are arranged in the rectangular area 81. A respective first anchor point 82 is arranged at each corner of the rectangular area 81, and in the second direction X, the second anchor points 83 are arranged between the plurality of second mass blocks 2. The micro-mechanical gyroscope further includes first coupling beams 9, second coupling beams 10 and third coupling beams 11, the first coupling beams 9 and the second coupling beams 10 are flexible beams. Each end of a first mass block 1 in the second direction X is connected to a respective first anchor point 82 through a respective first coupling beam 9, each second mass block of the plurality of second mass blocks 2 is connected to a respective second anchor point 83 through a respective second coupling beam 10 and each end of a driving member 3 in the first direction Y is connected to a respective first anchor point 82 through a respective third coupling beam 11.

Figure 8:
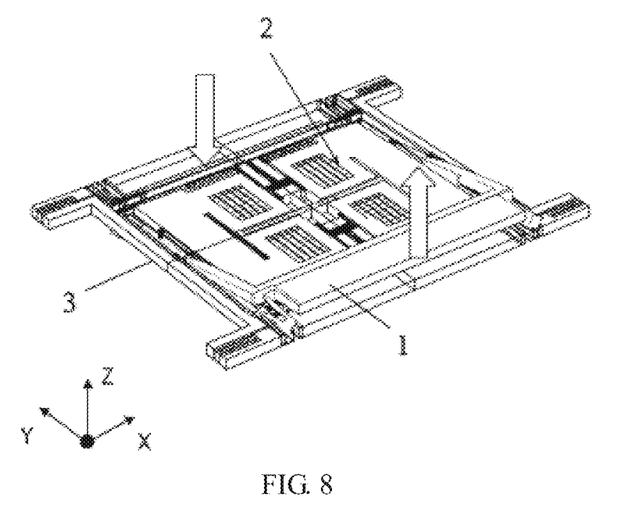
FIG. 8 is a structure diagram of the micro-mechanical gyroscope in the first detection mode according to some embodiments of the present disclosure.

When the micro-mechanical gyroscope is in the first detection mode, the first mass blocks 1 are subjected to the Coriolis forces. Due to the connection of the first mass blocks 1 to the first anchor points 82, the first mass blocks 1 generate out-of-plane flip along the Z-axis.

Figure 9:
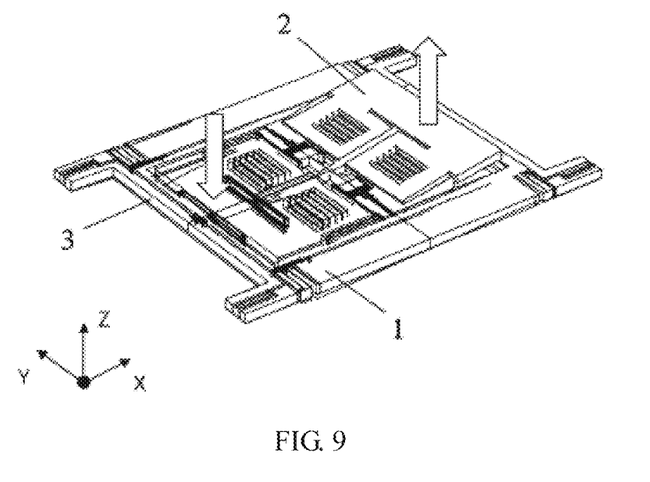
FIG. 9 is a structure diagram of the micro-mechanical gyroscope in the second detection mode according to some embodiments of the present disclosure.

When the micro-mechanical gyroscope is in the second detection mode, the second mass blocks 2 are subjected to the Coriolis forces. Due to the connection of the second mass blocks 2 to the second anchor points 83, the second mass blocks 2 generate out-of-plane flip along the Z-axis.

The first coupling beams 9 and the second coupling beams 10 are used to provide in-plane oscillation degrees of freedom and out-of-plane flip degrees of freedom, and the third coupling beams 11 are used to provide in-plane oscillation degrees of freedom.

In some embodiments, the micro-mechanical gyroscope further includes fourth coupling beams 12 being flexible beams. In the second direction X, two second coupling beams 10 are connected to each other through a respective fourth coupling beam 12.

In some embodiments, the micro-mechanical gyroscope further includes coupling parts 13 being flexible parts. In the second direction X, the plurality of second mass blocks 2 are connected to each other through the coupling parts 13. In this way, parasitic modes in detection can be effectively suppressed, thereby improving the detection accuracy of the micro-mechanical gyroscope.

In some embodiments, a coupling part 13 has a body part 131 and a fifth coupling beam 132. Each end of the body part 131 in the second direction X is connected to a respective second mass block 2 through a respective fifth coupling beam 132.

Embodiments of the present disclosure further provide an electronic product including a main body and the micro-mechanical gyroscope as illustrated above, and the micro-mechanical gyroscope is installed in the main body.

In the working process of the electronic product, the micro-mechanical gyroscope can calculate the angular velocity of the electronic product, for easy control of the electronic product. The micro-mechanical gyroscope can reduce the degree of mutual interference of the plurality of first mass blocks 1 and the plurality of second mass blocks 2 in different modes and improve the detection accuracy, thereby improving the performance of the electronic product.

The above mentioned are only the embodiments of the present disclosure. It should be pointed out that for those skilled in the art, improvements may be made without departing from the inventive concept of the present disclosure, but these are all within the scope of protection of the present disclosure.

What is claimed is:

1. A micro-mechanical gyroscope, comprising:
   two first mass blocks and two second mass blocks, wherein the two first mass blocks are spaced apart from each other in a first direction, and the two second mass blocks are arranged between the two first mass blocks and spaced apart from each other in a second direction perpendicular to the first direction;
   two driving members, wherein in the second direction, the two driving members are spaced apart from each other, and the two first mass blocks and the two second mass blocks are arranged between the two driving members; and
   a connecting frame, wherein the connecting frame has a rectangular ring shape, and the two second mass blocks are surrounded by the connecting frame, the two first mass blocks and the two driving members surround the connecting frame;
   wherein each first mass block is connected to a side wall of the connecting frame corresponding thereto and perpendicular to the first direction through two first connecting beams spaced apart from each other in the second direction, each second mass block is connected to a side wall of the connecting frame corresponding thereto and perpendicular to the second direction through a second connecting beam, each driving member is connected to a side wall of the connecting frame corresponding thereto and perpendicular to the second direction through a third connecting beam, each first connecting beam and each second connecting beam are flexible beams, each third connecting beam has a bent segment.

2. The micro-mechanical gyroscope according to claim 1, wherein the two first mass blocks are symmetrically arranged along the first direction about a center of the micro-mechanical gyroscope, the two second mass blocks are symmetrically arranged along the second direction about the center of the micro-mechanical gyroscope, and the two driving members are symmetrically arranged along the second direction about the center of the micro-mechanical gyroscope.

3. The micro-mechanical gyroscope according to claim 1, further comprising a base having a rectangular area, four first anchor points respectively arranged at four corners of the rectangular area and two second anchor points arranged between the two second mass blocks and spaced apart from each other in the first direction;

wherein each first mass block has a rectangular shape, and each side of the two first mass blocks perpendicular to the second direction is connected to a first anchor point corresponding thereto through a first coupling beam; each second mass block is connected to a respective second anchor point through a respective second coupling beam; each driving member comprises two first portions spaced apart from each other in the first direction and perpendicular to the first direction and a second portion connecting the two first portions and perpendicular to the second direction, and each first portion of the two driving members is connected to a first anchor point corresponding thereto through a third coupling beam; each first coupling beam and each second coupling beam are flexible beams.

4. The micro-mechanical gyroscope according to claim 3, further comprising fourth coupling beams being flexible beams, wherein in the second direction, two second coupling beams are connected to each other through a respective fourth coupling beam.

5. The micro-mechanical gyroscope according to claim 3, wherein each driving member has an accommodation space formed by the two first portions and the second portion on a side away from the two second mass blocks, and each accommodation space has an in-plane driving transducer arranged therein;

wherein each second mass block has an out-of-plane detection transducer and two sets of in-plane detection transducers arranged thereon, on the same second mass block, the out-of-plane detection transducer is spaced apart from the two sets of in-plane detection transducers in the second direction, and the two sets of in-plane detection transducers are spaced apart from each other in the first direction; and each first mass block has another out-of-plane detection transducer arranged thereon.

6. The micro-mechanical gyroscope according to claim 5, wherein the two out-of-plane detection transducers respectively arranged on the two first mass blocks are symmetrically arranged along the first direction about a center of the micro-mechanical gyroscope, the two out-of-plane detection transducers respectively arranged on the two second mass blocks are symmetrically arranged along the second direction about the center of the micro-mechanical gyroscope, and the four sets of in-plane detection transducers respectively arranged on the two second mass blocks are uniformly arranged along a perimeter of the micro-mechanical gyroscope.

7. The micro-mechanical gyroscope according to claim 1, wherein in the second direction, the two second mass blocks are connected to each other through a coupling part, wherein the coupling part is flexible.

8. An electronic product, comprising:
a main body; and
the micro-mechanical gyroscope according to claim 1;
wherein the micro-mechanical gyroscope is installed in the main body.

* * * * *